US010064175B2

(12) United States Patent
Baghel et al.

(10) Patent No.: US 10,064,175 B2
(45) Date of Patent: *Aug. 28, 2018

(54) METHOD AND APPARATUS FOR HANDLING IN-DEVICE CO-EXISTENCE INTERFERENCE IN A WIRELESS COMMUNICATION ENVIRONMENT

(71) Applicant: Samsung Electronics Co., Ltd., Gyeonggi-do (KR)

(72) Inventors: Sudhir Kumar Baghel, Bangalore (IN); Nitin Jain, Bangalore (IN); Venkateswara Rao Manepalli, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/884,745

(22) Filed: Oct. 15, 2015

(65) Prior Publication Data
US 2016/0037546 A1   Feb. 4, 2016

Related U.S. Application Data

(63) Continuation of application No. 13/877,834, filed as application No. PCT/KR2011/007332 on Oct. 4, 2011.

(30) Foreign Application Priority Data

Oct. 4, 2010 (IN) .......................... 2939/CHE/2010

(51) Int. Cl.
H04W 72/12 (2009.01)
H04W 72/04 (2009.01)
(Continued)

(52) U.S. Cl.
CPC ........ *H04W 72/0446* (2013.01); *H04B 1/109* (2013.01); *H04J 3/1694* (2013.01);
(Continued)

(58) Field of Classification Search
CPC ........ H04B 15/00; H04B 15/02; H04B 1/109; H04L 31/109; H04J 3/1694; H04W 16/14;
(Continued)

(56) References Cited

U.S. PATENT DOCUMENTS

2008/0107054 A1   5/2008  Parts et al.
2008/0205365 A1   8/2008  Russell et al.
(Continued)

FOREIGN PATENT DOCUMENTS

JP   2008228098 A    9/2008
JP   2011-530251 A  12/2011
(Continued)

OTHER PUBLICATIONS

International Search Report dated Feb. 15, 2012 in connection with International Patent Application No. PCT/KR2011/007332, 2 pages.
(Continued)

*Primary Examiner* — Jamal Javaid
*Assistant Examiner* — Rose Clark

(57) ABSTRACT

The present disclosure provides a method and apparatus of handling in-device co-existence interference in a wireless communication environment. In one embodiment, a method includes detecting in-device co-existence interference between a LTE module and an ISM module in user equipment. The method further includes identifying subframes and corresponding HARQ processes in a set of subframes allocated to the LTE module which are affected by the ISM module operation. Additionally, the method includes reserving the remaining subframes and corresponding HARQ
(Continued)

processes in the set of subframes for the LTE module operation. Furthermore, the method includes indicating to a base station that the remaining subframes and the corresponding HARQ processes are reserved for the LTE module operation to resolve the in-device co-existence interference. Moreover, the method includes receiving scheduling pattern indicating subframes and corresponding HARQ processes reserved for the LTE operation or derived DRX parameters from the base station based on the indication.

16 Claims, 6 Drawing Sheets

(51) Int. Cl.
  *H04B 1/10* (2006.01)
  *H04J 3/16* (2006.01)
  *H04W 72/08* (2009.01)
  *H04L 1/18* (2006.01)
  *H04W 76/28* (2018.01)
  *H04W 88/06* (2009.01)

(52) U.S. Cl.
  CPC .......... *H04L 1/1812* (2013.01); *H04L 1/1861* (2013.01); *H04W 72/082* (2013.01); *H04W 72/1215* (2013.01); *H04W 76/28* (2018.02); *H04W 88/06* (2013.01)

(58) Field of Classification Search
  CPC .......... H04W 36/28; H04W 52/0238; H04W 72/082; H04W 72/1215; H04W 76/00; H04W 76/02; H04W 76/025; H04W 76/04; H04W 76/048; H04W 88/06; H04W 24/04; H04W 72/0446
  See application file for complete search history.

(56) References Cited

U.S. PATENT DOCUMENTS

| | | | |
|---|---|---|---|
| 2009/0081962 A1 | 3/2009 | Sohrabi | |
| 2009/0083601 A1 | 3/2009 | Gorokhov et al. | |
| 2009/0225717 A1 | 9/2009 | Banerjea | |
| 2009/0279511 A1 | 11/2009 | Zhu | |
| 2010/0040033 A1 | 2/2010 | Xhafa et al. | |
| 2010/0061326 A1 | 3/2010 | Lee et al. | |
| 2010/0124184 A1 | 5/2010 | Dayal et al. | |
| 2010/0135256 A1* | 6/2010 | Lee | H04W 16/14 370/336 |
| 2010/0135272 A1 | 6/2010 | Dayal et al. | |
| 2010/0190447 A1 | 7/2010 | Agrawal et al. | |
| 2010/0203832 A1 | 8/2010 | Russell et al. | |
| 2011/0222428 A1 | 9/2011 | Charbit et al. | |
| 2011/0235612 A1 | 9/2011 | Abeta et al. | |
| 2011/0242969 A1 | 10/2011 | Dayal et al. | |
| 2011/0243047 A1* | 10/2011 | Dayal | H04W 16/14 370/311 |
| 2011/0243094 A1 | 10/2011 | Dayal et al. | |
| 2011/0312288 A1 | 12/2011 | Fu et al. | |
| 2012/0040715 A1 | 2/2012 | Fu et al. | |
| 2012/0069766 A1 | 3/2012 | Fu et al. | |
| 2012/0071103 A1* | 3/2012 | Kadous | H04W 72/1215 455/63.1 |
| 2012/0077532 A1 | 3/2012 | Kadous | |
| 2012/0082077 A1* | 4/2012 | Zhang | H04W 72/1215 370/311 |
| 2012/0093009 A1 | 4/2012 | Wang et al. | |
| 2013/0223391 A1* | 8/2013 | Koo | H04W 72/0406 370/329 |
| 2014/0050134 A1* | 2/2014 | Ahn | H04W 72/0413 370/311 |
| 2014/0092761 A1* | 4/2014 | Behravan | H04W 24/02 370/252 |
| 2014/0247759 A1* | 9/2014 | Zhang | H04W 52/0251 370/281 |
| 2015/0296556 A1* | 10/2015 | Lee | H04W 76/027 370/338 |

FOREIGN PATENT DOCUMENTS

| | | |
|---|---|---|
| JP | 2012501570 A | 1/2012 |
| RU | 2008 148 562 A1 | 6/2010 |
| WO | WO 2010/002219 A2 | 1/2010 |
| WO | WO 2010/073325 A1 | 7/2010 |
| WO | WO 2010/089281 A1 | 8/2010 |

OTHER PUBLICATIONS

Written Opinion of International Searching Authority dated Feb. 15, 2012 in connection with International Patent Application No. PCT/KR2011/007332, 4 pages.
Translated Japanese Examination Report dated Mar. 4, 2014 in connection with Japanese Patent Application No. 2013-532723; 6 pages.
Translated Russian Examination Report dated Jul. 28, 2014 in connection with Russian Patent Application No. 2013120334/07(030140); 7 pages.
Decision on Grant of Russian Patent dated Dec. 10, 2014 in connection with Russian Patent Application No. 2013120334/07/(030140); 19 pages.
3GPP TSG-RAN WG2 #70bis; "Methods for WLAN/Bluetooth in-device coexistence Interference avoidance"; R2-103900; Stockholm, Sweden; Jun. 28-Jul. 2, 2010; 3 pages.
3GPP TSG-RAN WG2 #71; "Discussion on in-device coexistence scenarios and solutions"; R2-104382; Madrid, Spain; Aug. 23-27, 2010; 3 pages.
3GPP TSG-RAN WG2 #71; "Problem Scenarios and Proposed Solutions for In-Device Coexistence"; R2-104910; Madrid, Spain; Aug. 23-27, 2010; 3 pages.
3GPP TSG-RAN WG2 #71; "Analysis in In-Device Coexistence Interference Avoidance"; R2-104444; Madrid, Spain; Aug. 23-27, 2010; 10 pages.
Communication from a related application, U.S. Appl. No. 13/877,834, Office Action dated Apr. 28, 2017, 14 pages.
CMCC, "Kickoff for SI on interference avoidance for in-device coexistence," 3GPP TSG-RAN WG2 Meeting #70bis, R2-103949, Stockholm, Sweden, Jun. 28-Jul. 2, 2010, 8 pages.
Foreign communication from a related counterpart application, KR Application No. 10-2013-7008671, Notification of the Reasons for Rejection dated Jun. 23, 2017, 7 pages.
Office Action dated Jan. 6, 2017 in connection with U.S. Appl. No. 13/877,834.
Office Action dated Nov. 4, 2015 in connection with U.S. Appl. No. 13/877,834.
Office Action dated Jun. 10, 2015 in connection with U.S. Appl. No. 13/877,834.
Office Action dated Jan. 30, 2015 in connection with U.S. Appl. No. 13/877,834.
Notice of Allowance dated Jan. 18, 2016 in connection with Japanese Patent Application No. 2015-025486.
"Timeline analysis of TDM solutions for coexistence with Bluetooth", Intel Corporation (UK) Ltd., 3GPP TSG-RAN WG2 Meeting #72, Nov. 15-19, 2010, 10 pages, R2-106585.
"Understanding the nature of issues related with in-device coexistence", Samsung, 3GPP Tsg-Ran WG2 #71, Aug. 23-28, 2010, 9 pp., R2-104329.
Office Action dated Jan. 26, 2017 in connection with United States Patent Application No. 14/887,131.
Examination Report dated Jan. 23, 2017 in connection with European Patent Application No. Ep 11 83 0886.
"Further analysis on in-device coexistence interference avoidance solutions", Zte, 3GPP Tsg-Ran WG2 Meeting #71 bis, 8 pp., R2-105361. n.

(56) References Cited

OTHER PUBLICATIONS

Foreign Communication from Related Counterpart Application; Canadian Patent Application No. 2813799; Canadian Office Action dated Mar. 1, 2018; 5 pages.

* cited by examiner

METHOD AND APPARATUS FOR HANDLING IN-DEVICE CO-EXISTENCE INTERFERENCE IN A WIRELESS COMMUNICATION ENVIRONMENT

CROSS-REFERENCE TO RELATED APPLICATION(S) AND CLAIM OF PRIORITY

The present application is a continuation of U.S. Non-Provisional patent application Ser. No. 13/877,834 filed Apr. 4, 2013 and entitled "METHOD AND APPARATUS FOR HANDLING IN-DEVICE CO-EXISTENCE INTERFERENCE IN A WIRELESS COMMUNICATION ENVIRONMENT," which is a national stage filing of Patent Cooperation Treaty Patent Application No. PCT/KR2011/07332 filed Oct. 4, 2011 and entitled "METHOD AND APPARATUS FOR HANDLING IN-DEVICE CO-EXISTENCE INTERFERENCE IN A WIRELESS COMMUNICATION ENVIRONMENT" which claims priority to Indian Patent Application No. 2939/CHE/2010 filed Oct. 4, 2010 and entitled "SYSTEM AND METHOD FOR HANDLING IN-DEVICE CO-EXISTENCE INTERFERENCE BETWEEN LTE AND ISM TECHNOLOGIES." The content of the above-identified patent documents is incorporated herein by reference.

TECHNICAL FIELD

The present disclosure relates to the field of wireless communication system, and more particularly relates to handling in-device co-existence interference in a wireless communication environment.

BACKGROUND

Coexistence of LTE with ISM (Bluetooth®, Wi-Fi® and the like) band technologies and global navigation satellite system (GNSS) technology is necessary to be provided as these are becoming very common combinations in mobile handsets. Each of these technologies is developed by different group to serve a specific purpose. Characteristics of each of these technologies are different. They operate in different frequencies, have different access mechanism, have different frame structure, and peak transmit power.

When all these technologies operate simultaneously in an adjacent band, (small separation, e.g., <20 MHz) usually 50 dB isolation is required. However, small form factor of the UE provides only 10-30 dB isolation. As a result, the transmitter of one radio severely affects the receiver of another radio. For example, a small form factor of the UE may pose great challenge of interference from transmission of ISM technology to the receiver of cellular technologies such as LTE or WiMAX. Similarly, the transmitter of cellular technology may cause severe interference to the ISM receiver. The main cause of in-device co-existence issues may be because of receiver blocking due to limited dynamic range of power amplifier. Analogue to Digital converter and out of band emission due to imperfect filtering.

SUMMARY

The present disclosure provides a method and apparatus of handling in-device co-existence interference in a wireless communication environment. In one embodiment, a method includes detecting in-device co-existence interference between a LTE module and an ISM module in user equipment. The method further includes identifying subframes and corresponding HARQ processes in a set of subframes allocated to the LTE module which are affected by the ISM module operation. Additionally, the method includes reserving the remaining subframes and corresponding HARQ processes in the set of subframes for the LTE module operation. Furthermore, the method includes indicating to a base station that the remaining subframes and the corresponding HARQ processes are reserved for the LTE module operation to resolve the in-device co-existence interference. Moreover, the method includes receiving scheduling pattern indicating subframes and corresponding HARQ processes reserved for the LTE operation or derived DRX parameters from the base station based on the indication.

The drawings described herein are for illustration purposes only and are not intended to limit the scope of the present disclosure in any way.

DETAILED DESCRIPTION

Technical Problem

LTE coexistence with Bluetooth®

Figure 1A:
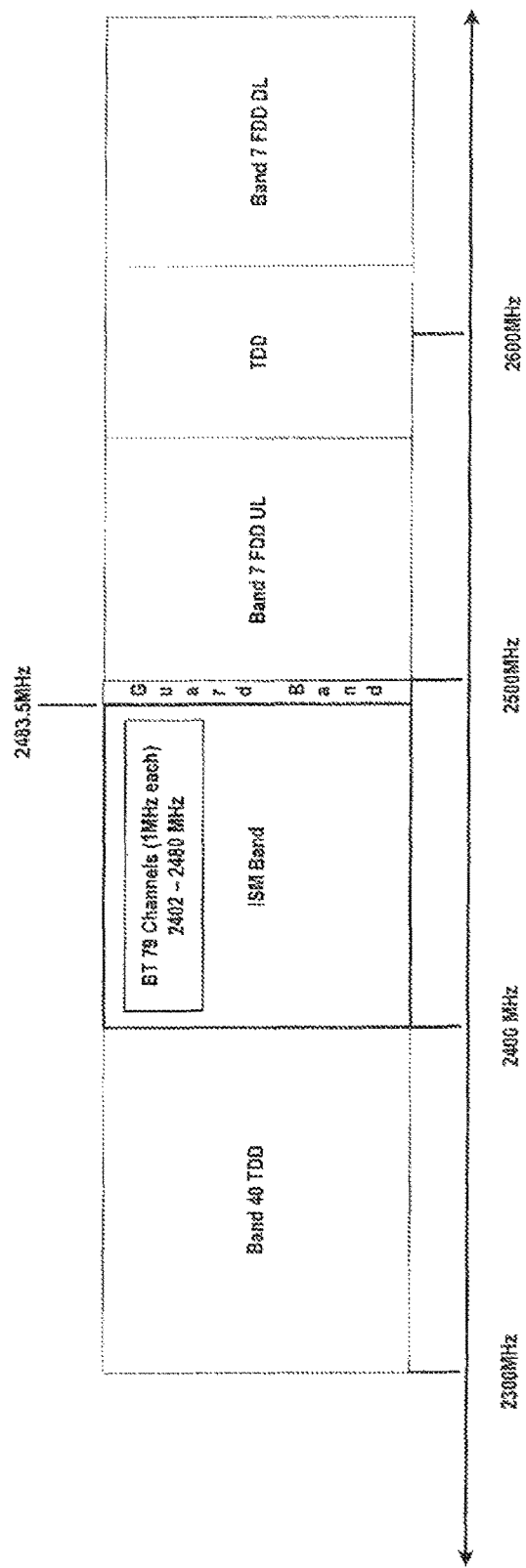
FIG. 1A is a schematic diagram illustrating separation between LTE and Bluetooth® channels, in the context of the disclosure.

A LTE band 7 UL and Bluetooth® band are separated by 20 MHz frequency band. The band 7 is FDD band and hence the LTE-receiver is not affected by the Bluetooth® transmitter whereas the LTE transmitter can affect the Bluetooth® receiver. Also, there is very negligible separation of 2 MHz between LTE band 40 (TDD band) and the Bluetooth® frequency band. Therefore, it is not possible to discontinue using higher portion of LTE band 40 in case of coexistence. FIG. 1A is a schematic diagram illustrating separation between LTE and Bluetooth® channels.

LTE Co-Existence with Wi-Fi®

Figure 1B:
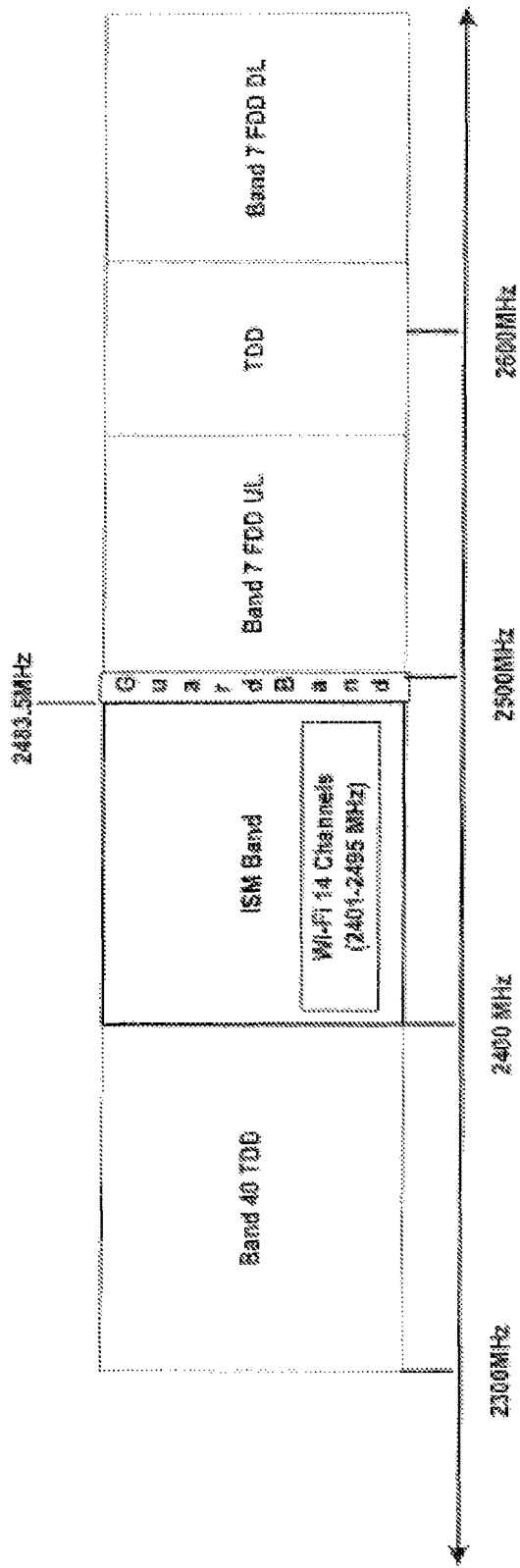
FIG. 1B is a schematic diagram illustrating separation between LTE and WiFi® channels, in the context of the disclosure.

There are 14 channels demarcated in an ISM band for a Wi-Fi® operation. Each channel is separated from other channel by 5 MHz with an exception of channel number 14 which is separated by 12 MHz. The channel 1 starts with 2401 MHz and hence there is almost no separation between LTE band 40 and Wi-Fi®. Channel 14 of Wi-Fi® ends at 2495 MHz so theoretically only 5 MHz separation is available between the LTE band 7 and the Wi-Fi®. Different countries have different policies for number of allowed channels of the Wi-Fi®. Currently, many countries allow only channel 1 to 13 whereas Japan allows usage of channel number 14 only for IEEE 802.11b based communication. This suggest even though in theory only 5 MHz separation is available between the Wi-Fi and the LTE band 7 but in practice at least 17 MHz is available. FIG. 1B is a schematic diagram illustrating separation between LTE and Wi-Fi® channels.

Technical Solution

A method of handling an in-device co-existence interference in a user equipment, comprising: detecting an in-device co-existence interference between a LTE module and an ISM module in a user equipment; identifying one or more subframes and corresponding HARQ processes in a set of subframes allocated to the LTE module which are affected by the ISM module operation; reserving the remaining subframes and corresponding HARQ processes in the set of subframes for the LTE module operation; and indicating, to a base station, that the remaining subframes and the corresponding HARQ processes in the set of subframes are reserved for the LTE module operation to resolve in-device co-existence interference between the LTE module and the ISM module.

An apparatus comprising: a processor; and memory coupled to the processor, wherein the memory includes an interference resolution module configured for: detecting an in-device co-existence interference between a LTE module and an ISM module; identifying one or more subframes and corresponding HARQ processes in a set of subframes allocated to the LTE module which are affected by the ISM module operation; reserving the remaining subframes and corresponding HARQ processes in the set of subframes for the LTE module operation; and indicating, to a base station, that the remaining subframes and the corresponding HARQ processes in the set of subframes are reserved for the LTE module operation to resolve in-device co-existence interference between the LTE module and the ISM module.

A method of handling an in-device co-existence interference in a user equipment, comprising: detecting an in-device co-existence interference between a LTE module and an ISM module of a user equipment; determining a set of parameters associated with a DRX operation to cause interference free operation of the LTE module and the ISM module; and communicating the set of parameters associated with the DRX operation to a base station in a wireless network.

An apparatus comprising: a processor; and memory coupled to the processor, wherein the memory includes an interference resolution module configured for: detecting an in-device co-existence interference between a LTE module and an ISM module; determining a set of parameters associated with a DRX operation to cause interference free operation between the LTE module and the ISM module; and communicating the set of parameters associated with the DRX operation to a base station in a wireless network.

A method of handling an in-device co-existence interference in a user equipment comprising: detecting an in-device co-existence interference between a LTE module and an ISM module of a user equipment; identifying a set of parameters associated with the LTE module in at least one of frequency domain and time domain to resolve the in-device co-existence interference; and transmitting a unified signaling message indicating the set of parameters such that the base station schedules data to the user equipment based on the set of parameters to provide interference free time to the LTE module and the ISM module.

An apparatus comprising: a processor; and memory coupled to the processor, wherein the memory includes an interference resolution module configured for: detecting an in-device co-existence interference between a LTE module and an ISM module; identifying a set of parameters associated with the LTE module in at least one of frequency domain and time domain to resolve the in-device co-existence interference; and transmitting a unified signaling message indicating the set of parameters to a base station such that the base station schedules data to the user equipment based on the set of parameters to provide interference free time to the LTE module and the ISM module.

Advantageous Effects

The present disclosure provides a method and apparatus of handling in-device co-existence interference in a wireless communication environment.

The present disclosure provides a method and apparatus for handling in-device co-existence interference in a user equipment. In the following detailed description of the embodiments of the subject matter of this disclosure, reference is made to the accompanying drawings that form a part hereof, and in which are shown by way of illustration specific embodiments in which the subject matter of this disclosure may be practiced. These embodiments are described in sufficient detail to enable those skilled in the art to practice the subject matter of this disclosure, and it is to be understood that other embodiments may be utilized and that changes may be made without departing from the scope of the present disclosure. The following detailed description is, therefore, not to be taken in a limiting sense, and the scope of the present disclosure is defined only by the appended claims.

Figure 2:
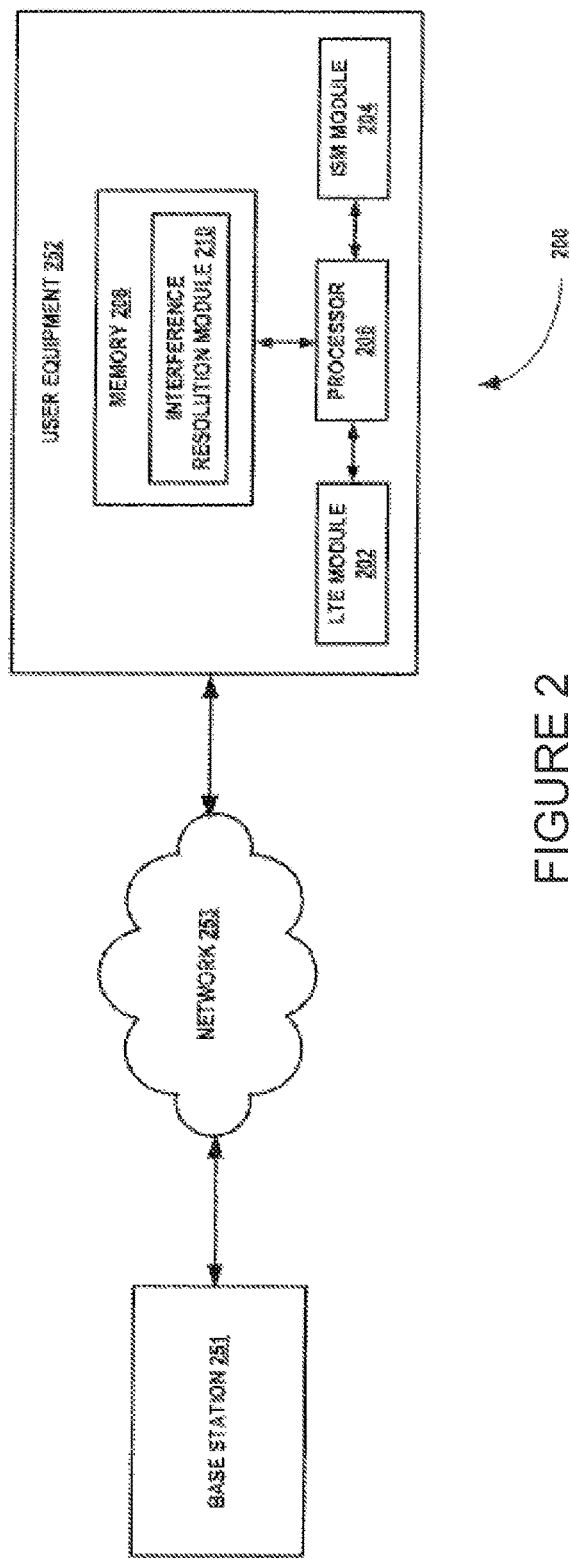
FIG. 2 illustrates a block diagram of wireless communication system for handling in-device co-existence interference between a LTE module and an ISM module in user equipment, according to one embodiment.

FIG. 2 illustrates a block diagram of wireless communication system 200 for handling in-device co-existence interference between a LTE module and an ISM module in user equipment, according to one embodiment. In FIG. 2, the wireless communication system 200 includes a base station (e.g., eNB) 250 and a user equipment (UE) 251 connected via a wireless network (e.g., LTE network) 253. The user equipment 252 includes a LTE module 202, an ISM module 204, a processor 206, and memory 208. The memory 208 includes an interference resolution module 210 stored in the form of instructions, that when executed by the processor 206, result in handling in-device co-existence interference between the LTE module 202 and the ISM module 204.

Consider that, the LTE module 202 and the ISM module 204 are ON and the interference resolution module 210 has detected that the LTE module 202 interferes with the operation of the ISM module 204. In such a case, the interference resolution module 210 ensures interference free operation of the LTE module 202 and the IBM module 204 by performing one of the methods described in FIGS. 3 to 5.

Figure 3:
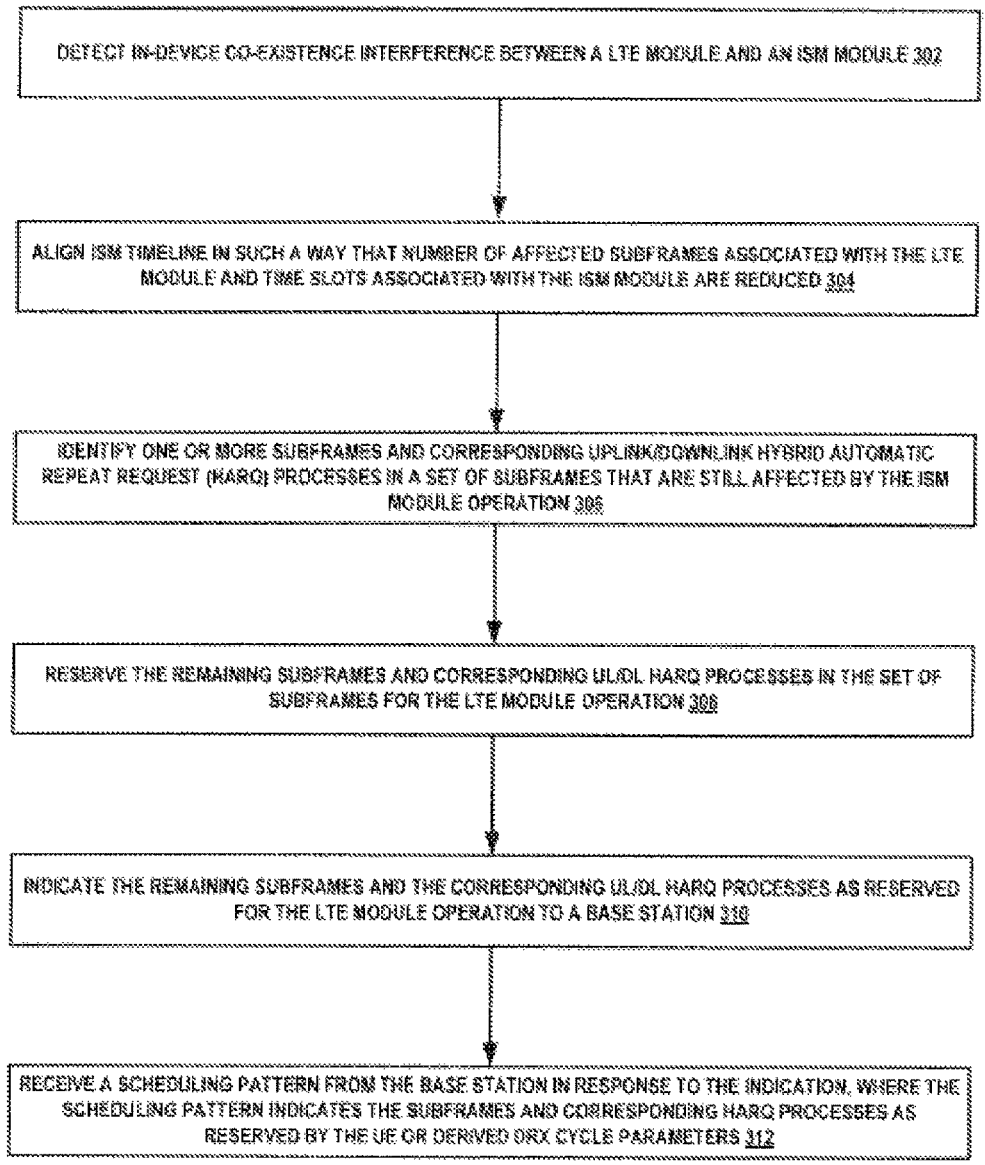
FIG. 3 is a process flowchart illustrating an exemplary method of handling in-device co-existence interference between the LTE module and the ISM module of the user equipment, according to one embodiment.

FIG. 3 is a process flowchart 300 illustrating an exemplary method of handling in-device co-existence interference between the LTE module 202 and the ISM module 204 of the user equipment (UE) 252, according to one embodiment. At step 302, in-device co-existence interference between the LTE module 202 and the ISM module 204 is detected. For example, the interference resolution module 210 may determine that the LTE module operation causes interference to the ISM module operation or get interfered by the ISM module operation. At step 304, the ISM timeline is aligned in such a way that number of affected sub-frames associated with the LTE module 202 and time slots associated with the ISM module 204 are reduced as much as possible to reduce the interference caused the LTE module 202 or the ISM module 204. If the interference still persists, then the interference resolution module 210 performs steps described below.

At step 306, one or more subframes and corresponding uplink/downlink hybrid automatic repeat request (HARQ) processes in a set of subframes that still interfere with or interfered by the ISM module operation are identified. At step 308, remaining subframes and corresponding UL/DL HARQ processes in the set of subframes are reserved for the LTE module operation. In step 310, the remaining subframes and the corresponding UL/DL HARQ processes are indicated as reserved for the LTE module operation to the base station 251 in a gap pattern. The remaining subframes and the corresponding UL/DL HARQ processes are indicated to the base station 251 when the UE 252 has received a message indicating whether the wireless network supports reporting of in-device co-existence interference at the UE 252.

In one embodiment, the remaining subframes and the corresponding UL/DL HARQ processes are represented and indicated to the base station 251 in a bitmap based gap pattern. The length of bitmap based gap pattern depends on LTE TDD configuration or a FDD mode of operation. For example, the length of bitmap for FDD is '8' and 'UL-DL configuration' in TDD domain. In another embodiment, the remaining subframes and the corresponding UL/DL HARQ processes are represented and indicated in terms of DRX parameters such as length of DRX cycle, on-duration timer interval and so on. In these embodiments, the DRX parameters or bitmap information is communicated in a message.

The message can be a new message (hereinafter referred to as in-device co-existence interference indication or IDC_IND) or existing LTE message such as measurement report. A new measurement trigger e.g., C1 can be introduced if the measurement report is used. When measurement reports are used for creating gap pattern, the measurement configuration related to the interference reporting may include specific measurement reporting events which clearly identify interference reporting. These events may be pre-configured or dynamically configured by the wireless communication network. The threshold for reporting these events can be based upon on RSRP, RSSI RSRP, SINR or any other general measurement in the UE 252. These thresholds are specified in the measurement configuration from the wireless communication network 253 to the UE 252.

The reserved subframes and UL/DL HARQ processes are indicated to the base station 251 to accommodate ISM/GNSS traffic during the identified subframes and the corresponding UL/DL HARQ processes. Based on the indication, the base station 251 is aware that there is in-device co-existence interference between the LTE module 202 and the ISM module 204 at the UE 251. Accordingly, the base station 251 incorporates the bitmap information/DRX parameters in scheduling UL/DL data to the UE 252.

At step 312, a scheduling pattern is received from the base station 251 in response to the indication. The scheduling pattern indicates reserved subframes and corresponding HARQ processes as determined by the UE 252 in a bitmap or derived DRX parameters. Alternatively, the base station 251 may indicate modified subframes and DL/UL HARQ processes via a modified bitmap or DRX parameters. For example, when the ISM module 204 is a Bluetooth® transceiver, the base station 251 provides at least one subframe to allow at least a pair of clean Bluetooth® Tx/Rx instances in each Bluetooth® interval and other subframes to the LTE module 202. It means that UE 252 can assume that the base station 251 restricts itself to DL allocation/UL grants inside the scheduling pattern. Accordingly, the scheduling pattern is applied to resolve in-device co-existence interference at the UE 252. Thus, in this manner, the above process provides interference free time to the LTE module 202 and the ISM module 204.

Figure 4:
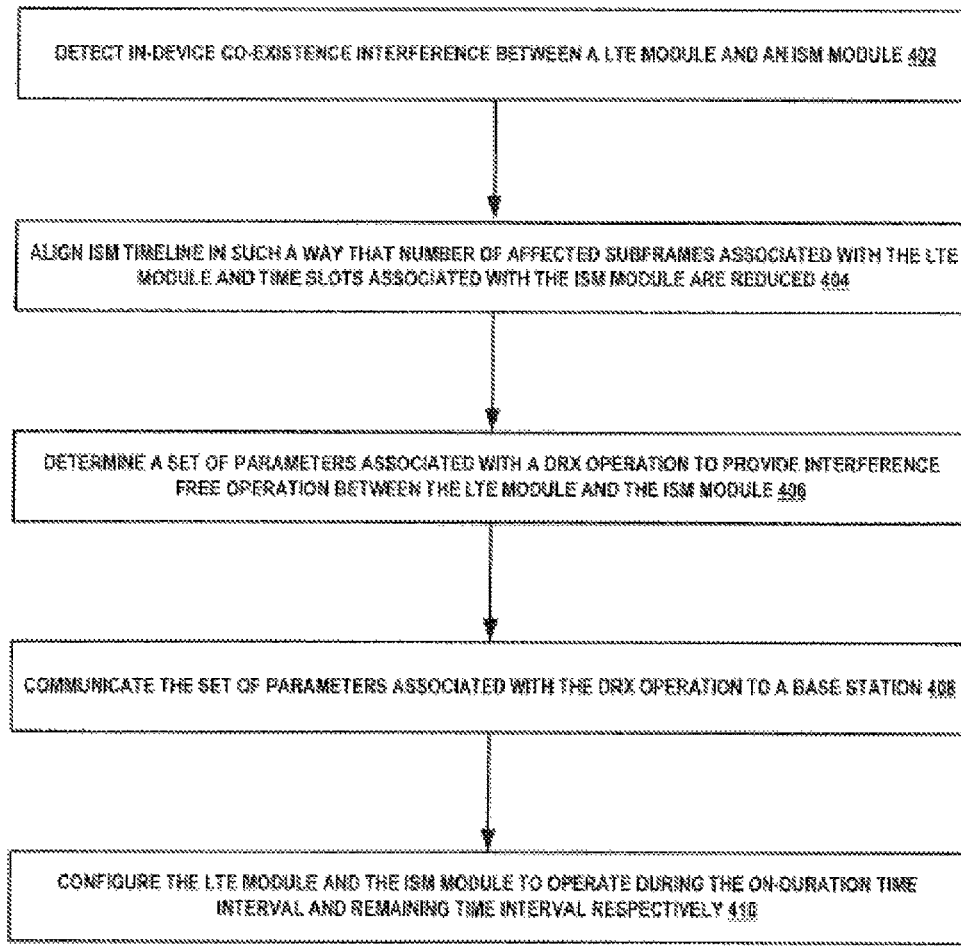
FIG. 4 is a process flowchart illustrating an exemplary method of handling in-device co-existence interference between the LTE module and the ISM module of the user equipment, according to another embodiment.

FIG. 4 is a process flowchart 400 illustrating an exemplary method of handling in-device co-existence interference between the LTE module 202 and the ISM module 204 of the UE 252, according to another embodiment. At step 402, in-device co-existence interference between the LTE module 202 and the ISM module 204 is detected. At step 404, the ISM timeline is aligned in such a way that number of affected subframes associated with the LTE module 202 and time slots associated with the ISM module 204 are reduced as much as possible.

At step 406, a set of parameters associated with DRX operation are determined to resolve in-device co-existence interference between the LTE module 202 and the ISM module 204. The set of parameters includes on-duration timer, inactivity timer, retransmission timer, and length of the DRX cycle. The values of parameters depend on the use case and the scenario of co-existence seen by the UE 252 at the moment and the ISM module activity it expects. At step 408, the set of parameters associated with the DRX operation is communicated to the base station 251. For example, the set of parameters are communicated in a measurement report (e.g., C1 measurement report) or any other message. In some embodiments, the set of parameters are transmitted to the base station 251 when the UE 252 has received a message indicating whether the wireless network supports reporting of in-device co-existence interference at the UE 252. Accordingly, the base station 251 configures DRX cycle parameters based on the set of parameters associated with the DRX cycle.

At step 410, the LTE module 202 and the ISM module 204 are configured to operate during the on-duration time interval and remaining time interval (DRX cycle—on-duration timer) respectively. In some embodiments, the in-activity timer is set to a value zero till the in-device co-existence interference exists between the LTE module 202 and the ISM module 204. In these embodiments, activities of the LTE module 202 are suspended doting the remaining time interval of the DRX cycle (e.g., when the in-activity timer is running). For example, the LTE module activity such as adaptive/non-adaptive UL retransmissions, DL retransmissions, service request, and contention resolution is suspended during the in-activity timer. In one embodiment, the LTE module activities are suspended by setting the retransmission timer to a value zero till the in-device co-existence interference exists between the LTE module 202 and the ISM module 204. Thus, the ISM module activity is allowed without interference when the in-activity timer is running.

The gap patterns discussed above tries to make either LTE module 202 or ISM module 204 to be operational at any given point of time. However, the gap patterns may be designed in such a way that transmission and/or reception of LTE signals are synchronized with transmission and/or reception of ISM signals. It may also be possible that a short duration transmission or reception in LTE signals may not affect the reception or transmission of the ISM signals and vice versa because of strong channel coding available in the corresponding technology and hence can be allowed. Therefore, the gap design can consider the above said flexibility available due to channel coding. Such autonomous UE behavior of determining as when to operate the LTE module and/or the ISM module for creating gap pattern for some rare situation helps in reducing the design of many gap patterns. This occasional UE autonomous behavior is needed for effective handling of in-device co-existence interference. The UE 252 may decide autonomously to perform UL/DL activity to protect small infrequent but important events of other technology and hence create autonomous gaps keeping the minimal BLER requirements for LTE transmission and reception.

In LTE measurement gaps are supported to help UE perform inter-frequency measurement. In another embodiment measurement gap can be used to provide the desired TDM solution to solve for in-device co-existence interference with small change in values of the measurement gap related parameters.

Figure 5:
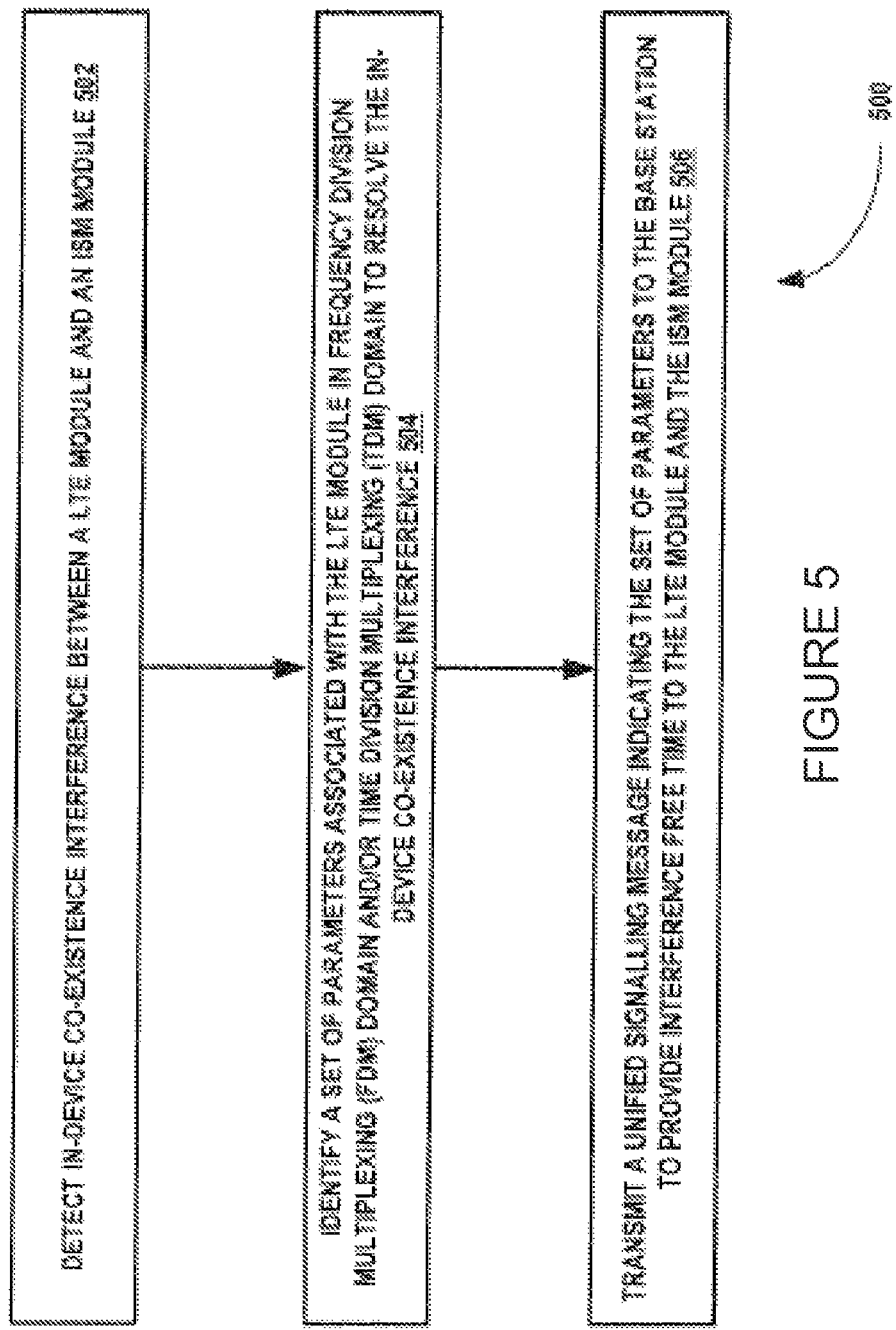
FIG. 5 is a process flowchart illustrating an exemplary method of handling in-device co-existence interference between the LTE module and the ISM module of the user equipment, according to yet another embodiment.

FIG. 5 is a process flowchart 500 illustrating an exemplary method of handling in-device co-existence interference between the LTE module 202 and the ISM module 204 of the UE 252, according to yet another embodiment. At step 502, in-device co-existence interference between the LTE module 202 and the ISM module 204 is detected. At step 504, a set of parameters associated with the LTE module 202 in Frequency Division Multiplexing (FDM) domain and/or Time Division Multiplexing (TDM) domain is identified to resolve the in-device co-existence interference. In FDM domain, the set of parameters includes one or more frequencies in the LTE band which cause interference to the ISM module 204 or are affected by the ISM module 204. In TDM domain, the set of parameters includes DRX cycle parameters and/or reserved HARQ process values (e.g. bitmap pattern) associated with the LTE module operation. For example, the DRX cycle parameters include on duration timer value, length of DRX cycle, re-transmission timer value, and inactivity timer value. The HARQ process values includes one or more subframes and corresponding HARQ processes in a set of subframes which do not contribute to the in-device co-existence interference.

At step 506, a unified signaling message indicating the set of parameters is transmitted to the base station 251 to provide interference free time to the LTE module 202 and the ISM module 204. A unified signaling is a mechanism in which FDM and/or TDM solution related parameters are communicated simultaneously to the base station 251. The unified signaling message is transmitted to the base station 251 only when the UE 252 is aware that the wireless network supports reporting of in-device co-existence interference detected at the UE 252. Also, the unified signaling message indicates whether the UE 252 prefers a TDM based solution or a FDM based solution to resolve the in-device co-existence interference.

Accordingly, the base station 251 schedules data to the UE 252 in TDM domain or selects the FDM domain solution based on the set of parameters. If the TDM solution is selected, the UE 252 receives a scheduling pattern from the base station 251 in response to the set of parameters associated with the TDM domain. If the FDM solution is selected, then the UE 252 may be notified through a message indicating that a FDM solution is selected to resolve in-device co-existence interference, where the message may include a handover command to handover a wireless connection from one component carrier (e.g., Primary cell) to another or a deactivation command to deactivate the affected component carrier(s) (e.g., Secondary cells). The FDM solution refers to the base station 251 decision to prepare the UE 252 and the wireless communication network 253 for inter-frequency handover.

The UE 252 is also configured to detect end of in-device co-existence interference between the LTE module 202 and the ISM module 204. When there is no interference, the UE 252 communicates the end of in-device co-existence interference between the LTE module 202 and the ISM module 204 via a unified signaling message, a measurement report, a radio resource connection (RRC) message, or a new message. In an example, the unified signaling message can also have enable and disable kind of signaling. The 'signal enable' is used when in-device co-existence interference is detected, whereas the 'signal disable' is used when the in-device co-existence interference is no more present.

In LTE, in the case of UL scheduling, there is a considerable time from the instance a grant is received on a PDCCH and the corresponding UL transmission is carried over the air interface. An UL grant received in TTI 'n' is applicable for TTI 'n+k' where 'k' is 4 in case of FDD and depends on 'UL-DL Configuration' and varies from one another. Depending on the value of 'k', the UE has the prior knowledge of UL transmission.

In one embodiment of the present disclosure, the prior knowledge of UL transmission can be exploited in determining the gap pattern. So it is possible that the UE 252 may not send the suggested bit pattern for UL and the base station 251 can schedule the UE 252 in any of the UL TTI and the UE 252 uses the knowledge of frame relevance to turn ON/OFF ISM module activity.

In the LTE DL, data assignments received in TTI 'n' are applicable in same TTI, i.e., TTI 'n'. At most, first 3 symbols of a sub frame are used for PDCCH and the PDCCH decoding based on the corresponding UE RNTI reveals if the data is for the UE 251. In this case, if the UE 252 can decode the PDCCH quick enough well before the end of the subframe, the UE 252 have good enough time to activate the ISM radio if the UE 252 figures out that there is no data in that particular TTI for it.

Alternatively, the UE 252 can activate the ISM radio based on the PDCCH decoding, provided the UE 252 can decode the PDCCH well before the end of the subframe. To enhance the PDCCH decoding time, the base station 251 can use the reduced search space for scheduling the UE 252 if the UE 252 has reported the in-device coexistence interference to the base station 251.

In one exemplary implementation, the unified signaling process described above works in the manner as follows. The base station indicates to the UE 252 that it supports "interference reporting" and also configures number of component carriers (CCs) that can be considered for reporting in-device co-existence interference via a system information block or specified dedicated message. When the UE 252 detects in-device co-existence interference, the UE 252 decides whether to report the presence of in-device coexistence interference to the base station 251 or can itself handle the in-device coexistence interference. If the UE 252 reports the in-device co-existence interference to the base station 251 through measurement reports or any other message (IDC_IND). For example, the UE 252 reports the preference of a FDM or TDM solution per single carrier or a set of the carriers. If a TDM solution is indicated for any corresponding carrier, the UE 252 reports a gap pattern indicating UE availability/non-availability for UL/DL scheduling of data. As illustrated in step 504, the UE 252 indicates subframes and corresponding HARQ reserved for LTE module operation in a bitmap or DRX parameters. Further, the UE 252 may also report the duration for which the above mentioned solution is applicable.

After receiving the measurement report or any other message (IDC_IND). The base station 251 decides whether to select FDM solution or TDM solution to resolve in-device co-existence interference. If the base station 251 selects a FDM solution, then the base station 251 deactivates a carrier if it is a secondary cell and reported as facing/causing in-device co-existence interference. Otherwise, the base station 251 performs handover if the component carrier is primary cell and the component carrier reported as facing/causing in-device co-existence interference.

Alternatively, if the base station 251 selects a TDM solution, then the base station 251 indicates subframes and corresponding HARQ processes reserved for the LTE module operations or DRX cycle parameters to the UE 252. The subframes and corresponding HARQ processes or DRX parameters may be the same or modified version of the reserved subframes and corresponding HARQ processes or DRX cycle parameters previously communicated by the UE 252. The base station 251 may indicate the above information in a bitmap based gap pattern or in DRX parameters derived from the UE reported HARQ bitmap or DRX parameters. In case the gap pattern (either bitmap or DRX parameters) is absent in the response received from the base station 251, the LIE 252 can assume that the gap pattern sent to the base station 251 is to be applied.

In order to synchronize the UE with above configuration parameters, the base station 251 can opt to initiate an intra-cell handover procedure and sends new configuration to the UE 252 in a handover message. Additionally, the base station 251 may provide a parameter corresponding to the validity of configuration to the UE 252 in the response from the base station 251. In case the UE 252 does not report that the in-device coexistence interference is over, the UE 252 and the base station 251 use the validity timer to release the configuration related to in-device coexistence interference and then the normal operation starts. In case, the UE 252 wants to extend the validity of the configuration, the UE 252 can send a measurement report or other message (e.g. IDC_IND) including all the parameters (DRX cycle parameters, reserved subframes and corresponding HARQ processes, and affected frequencies).

Although the present embodiments have been described with reference to specific examples, it will be evident that various modifications and changes may be made to these embodiments without departing from the broader spirit and scope of the various embodiments. Furthermore, the various devices, modules, selectors, estimators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

Glossary of Terms and their Definitions

SINR: Signal-to-noise plus interference ratio
RSRP: Reference Signal Received Power
RSSI: Received Signal Strength Indication
RNTI: Radio Network Temporary Identifier
TTI: Transmission Time Interval
DRX: Discontinuous Reception
PDCCH: Physical Downlink Control Channel
HARQ: Hybrid Automatic Repeat Request
LTE: Long Term Evolution
ISM: The Industrial, Scientific and Medical Radio Band
GNSS: Global Navigation Satellite Systems
BLER: Block Error Rate
FDM: Frequency Division Multiplexing
FDD: Frequency-Division Duplexing
TDM: Time Division Multiplexing
TDD: Time Division Duplexing
Wi-Max: Worldwide Interoperability for Microwave Access
UL: Uplink
DL: Downlink
IEEE: Institute of Electrical and Electronics Engineers.

What is claimed is:

1. A method of transmitting a message associated with an in-device co-existence interference in a user equipment, the method comprising:
   detecting an in-device co-existence interference between a first radio frequency module and a second radio frequency module in a user equipment;
   receiving, from a base station, a configuration message indicating that the base station supports reporting on an in-device co-existence interference;
   transmitting, to the base station, a message associated with the in-device co-existence interference, the message including one or more frequencies affected by the second radio frequency module of the user equipment and a pattern corresponding to a hybrid automatic repeat request (HARQ) process, wherein the pattern indicates one or more sub-frames to be abstained from using due to being affected by operation of the second radio frequency module; and
   transmitting, to the base station, a new message associated with the in-device co-existence interference when there is no in-device co-existence interference.

2. The method of claim 1, further comprising:
   receiving a scheduling pattern from the base station in response to transmitting the message.

3. The method of claim 2, wherein the scheduling pattern indicates discontinuous reception (DRX) parameters derived based on the message.

4. The method of claim 1, wherein the pattern that indicates the one or more sub-frames to be abstained from using is represented in a bitmap.

5. The method of claim 1, wherein the first radio frequency module is for long term evolution (LTE).

6. The method of claim 1, wherein the second radio frequency module is for an industrial, scientific and medical (ISM) radio band.

7. The method of claim 1, wherein the message includes a parameter associated with discontinuous reception (DRX).

8. A user equipment for transmitting a message associated with an in-device co-existence interference, the user equipment comprising:
   a memory; and
   a processor coupled to the memory, wherein the processor is configured to:
   detect an in-device co-existence interference between a first radio frequency module and a second radio frequency module in a user equipment;
   receive, from a base station, a configuration message indicating that the base station supports reporting on an in-device co-existence interference;
   transmit, to the base station, a message associated with the in-device co-existence interference, the message including one or more frequencies affected by the second radio frequency module of the user equipment and a pattern corresponding to a hybrid automatic repeat request (HARQ) process, wherein the pattern indicates one or more sub-frames to be abstained from using due to being affected by operation of the second radio frequency module; and transmit, to the base station, a new message associated with the in-device co-existence interference when there is no in-device co-existence interference.

9. The user equipment of claim 8, the processor is further configured to:

receive a scheduling pattern from the base station in response to the transmitted message.

10. The user equipment of claim 9, wherein the scheduling pattern indicates discontinuous reception (DRX) parameters derived based on the message.

11. The user equipment of claim 8, wherein the pattern that indicates the one or more sub-frames to be abstained from using is represented in a bitmap.

12. The user equipment of claim 8, wherein the first radio frequency module is for long term evolution (LTE).

13. The user equipment of claim 8, wherein the second radio frequency module is for an industrial, scientific and medical (ISM) radio band.

14. The user equipment of claim 8, wherein the message includes a parameter associated with discontinuous reception (DRX).

15. The method of claim 7, wherein the parameter associated with DRX comprises a given point of time at which the first radio frequency module or the second radio frequency module operates the DRX.

16. The user equipment of claim 14, wherein the parameter associated with DRX comprises a given point of time at which the first radio frequency module or the second radio frequency module operates the DRX.

* * * * *